(12) United States Patent
Diner et al.

(10) Patent No.: US 9,516,579 B1
(45) Date of Patent: Dec. 6, 2016

(54) SOCIAL BANDWIDTH AND CONNECTIVITY SHARING

(71) Applicant: wildfire.exchange, inc., San Francisco, CA (US)

(72) Inventors: Fahri Diner, Geyersville, CA (US); Bojan Likar, Cupertino, CA (US)

(73) Assignee: wildfire.exchange, inc., San Francisco, CA (US)

( * ) Notice: Subject to any disclaimer, the term of this patent is extended or adjusted under 35 U.S.C. 154(b) by 0 days.

(21) Appl. No.: 14/788,080

(22) Filed: Jun. 30, 2015

Related U.S. Application Data

(60) Provisional application No. 62/019,348, filed on Jun. 30, 2014.

(51) Int. Cl.
| | |
|---|---|
| *H04W 48/10* | (2009.01) |
| *H04W 4/00* | (2009.01) |
| *H04W 12/04* | (2009.01) |
| *H04W 12/08* | (2009.01) |
| *H04W 76/02* | (2009.01) |
| *H04W 48/16* | (2009.01) |

(52) U.S. Cl.
CPC ............ *H04W 48/10* (2013.01); *H04W 4/008* (2013.01); *H04W 12/04* (2013.01); *H04W 12/08* (2013.01); *H04W 48/16* (2013.01); *H04W 76/02* (2013.01)

(58) Field of Classification Search
CPC ...................................................... H04W 48/10
USPC ............................... 455/414.3, 436–437, 441
See application file for complete search history.

(56) References Cited

U.S. PATENT DOCUMENTS

| | | | |
|---|---|---|---|
| 8,755,385 B2 * | 6/2014 | Popa ..................... | H04L 63/065 370/392 |
| 2015/0127939 A1* | 5/2015 | Mazandarany ........... | H04L 9/32 713/168 |

* cited by examiner

*Primary Examiner* — Michael T Vu
(74) *Attorney, Agent, or Firm* — Clements Bernard PLLC; Lawrence A. Baratta, Jr.; Christopher L. Bernard

(57) ABSTRACT

A decryption key and a network name are received by a cloud-based social bandwidth manager from an Internet-connected device that acts as a wireless access point for a wireless network, wherein a beacon broadcasted by the Internet-connected device includes the network name and an encrypted passphrase, and wherein the encrypted passphrase can be decrypted using the decryption key. An indication that a wireless enabled device is an authorized device to associate with the wireless network and share an Internet connection of the Internet-connected device is received from the Internet-connected device The network name and the decryption key are transmitted to the authorized wireless enabled device, wherein the authorized wireless enabled device is configurable to detect the beacon and decrypt the encrypted passphrase included in the beacon using the decryption key and associate with the wireless network using the decrypted passphrase to share the Internet connection of the Internet-connected device.

21 Claims, 3 Drawing Sheets

SOCIAL BANDWIDTH AND CONNECTIVITY SHARING

CROSS REFERENCE TO OTHER APPLICATIONS

This application claims priority to U.S. Provisional Patent Application No. 62/019,348 entitled SOCIAL BANDWIDTH AND CONNECTIVITY SHARING filed Jun. 30, 2014 which is incorporated herein by reference for all purposes.

BACKGROUND OF THE INVENTION

Tethering is increasingly used to share the Internet connection of a smartphone or tablet with other devices (e.g., laptops) without Internet access. The Internet-connected smartphone or tablet may be connected to the other devices via Wi-Fi (a wireless local area network), Bluetooth technology, or a physical connection using a cable, e.g., through USB (Universal Serial Bus). However, configuring a tethering session between the smartphone and another device can be a cumbersome and complicated process for many end-users. Therefore, improved techniques for sharing an Internet connection among multiple users or user devices would be desirable.

BRIEF DESCRIPTION OF THE DRAWINGS

Various embodiments of the invention are disclosed in the following detailed description and the accompanying drawings.

DETAILED DESCRIPTION

The invention can be implemented in numerous ways, including as a process; an apparatus; a system; a composition of matter; a computer program product embodied on a computer readable storage medium; and/or a processor, such as a processor configured to execute instructions stored on and/or provided by a memory coupled to the processor. In this specification, these implementations, or any other form that the invention may take, may be referred to as techniques. In general, the order of the steps of disclosed processes may be altered within the scope of the invention. Unless stated otherwise, a component such as a processor or a memory described as being configured to perform a task may be implemented as a general component that is temporarily configured to perform the task at a given time or a specific component that is manufactured to perform the task. As used herein, the term 'processor' refers to one or more devices, circuits, and/or processing cores configured to process data, such as computer program instructions.

A detailed description of one or more embodiments of the invention is provided below along with accompanying figures that illustrate the principles of the invention. The invention is described in connection with such embodiments, but the invention is not limited to any embodiment. The scope of the invention is limited only by the claims and the invention encompasses numerous alternatives, modifications and equivalents. Numerous specific details are set forth in the following description in order to provide a thorough understanding of the invention. These details are provided for the purpose of example and the invention may be practiced according to the claims without some or all of these specific details. For the purpose of clarity, technical material that is known in the technical fields related to the invention has not been described in detail so that the invention is not unnecessarily obscured.

Figure 1:
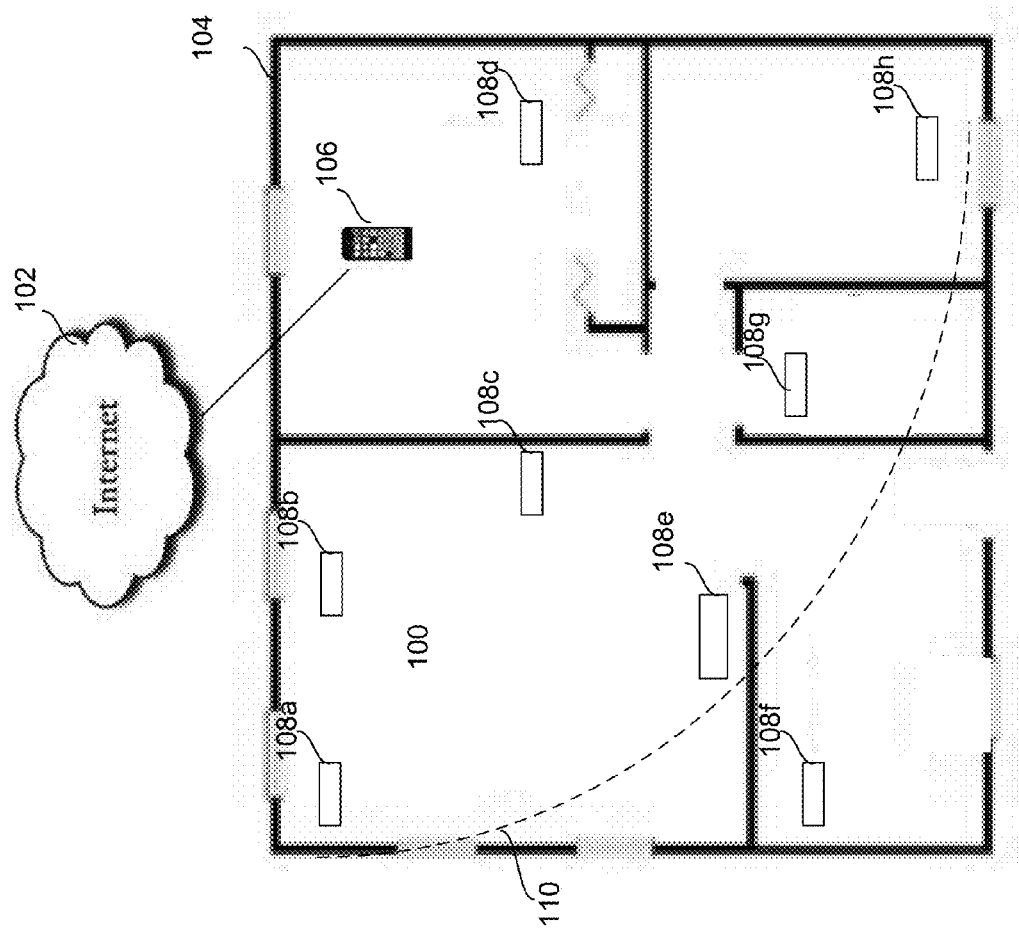
FIG. 1 illustrates that an Internet connection of a user device may be shared with other user devices at a location 104 using tethering.

FIG. 1 illustrates that an Internet connection of a user device may be shared with other user devices at a location 104 using tethering. Location 104 may be a home, an apartment, an office building, an outdoor area, within a vehicle, and the like. An Internet-connected user device 106 may be a mobile device (e.g., a smartphone or tablet) that is connected to the backbone Internet 102 via a cellular network, such as a GSM (Global System for Mobile Communications), CDMA (code division multiple access), or LTE (Long-Term Evolution) network. Internet-connected user device 106 may act as a portable wireless access point (AP), connecting to the other wireless enabled devices (108a-108h) via a wireless network 100. Wireless network 100 may be one of various types of wireless networks, including wireless local area network (Wi-Fi), Bluetooth technology, MiFi, and the like. Configured wireless enabled devices 108 (108a-108h) may connect to Internet-connected user device 106 as wireless clients when they are within the Internet-connected user device's wireless coverage area 110. Wireless enabled devices 108 may include desktop computers, laptop computers, tablets, or other mobile computing devices.

However, configuring a wireless enabled device to connect to Internet-connected user device 106 can be a cumbersome and complicated process for many end-users. For example, in order to associate with Internet-connected user device 106 via Wi-Fi, a Wi-Fi enabled device needs to be configured with the correct service set identifier (SSID) and passphrase corresponding to the Internet-connected user device. An SSID is a unique ID that includes 32 characters and is used for naming a wireless network. For most public and many private Wi-Fi networks, the SSID of the network is broadcasted such that any user may try to connect to it. However, the user can connect to the network only if the user has knowledge of the configured passphrase; the longer the length of the passphrase, the more secure it is from brute-force attacks by an unauthorized user. Typically, an authorized end-user needs to memorize or keep track of a very long passphrase and enter the long passphrase manually and correctly. Similarly, in order to associate with Internet-connected user device 106 via Bluetooth technology, a Bluetooth enabled device needs to be configured with the correct passkey.

In the present application, a system for sharing with other devices a network connection of an Internet-connected user device that belongs to a particular user is disclosed. The system is also referred to as a social bandwidth sharing system. The devices sharing another device's network connection may be any authorized non-Internet-connected user devices. For example, the devices sharing the network connection may include devices that do not have any cellular subscriptions and are owned by the same Internet-connected device user. Other devices that can share the network connection may also include any authorized devices that do not belong to the Internet-connected device user, such as the devices of the friends or family members of the Internet-connected device user, or any persons authorized by the user to share his/her network connection. In the present application, social bandwidth sharing friends or social bandwidth sharing friend devices may be used to refer to any authorized persons or authorized devices to associate with a wireless network to share a network connection.

Figure 2:
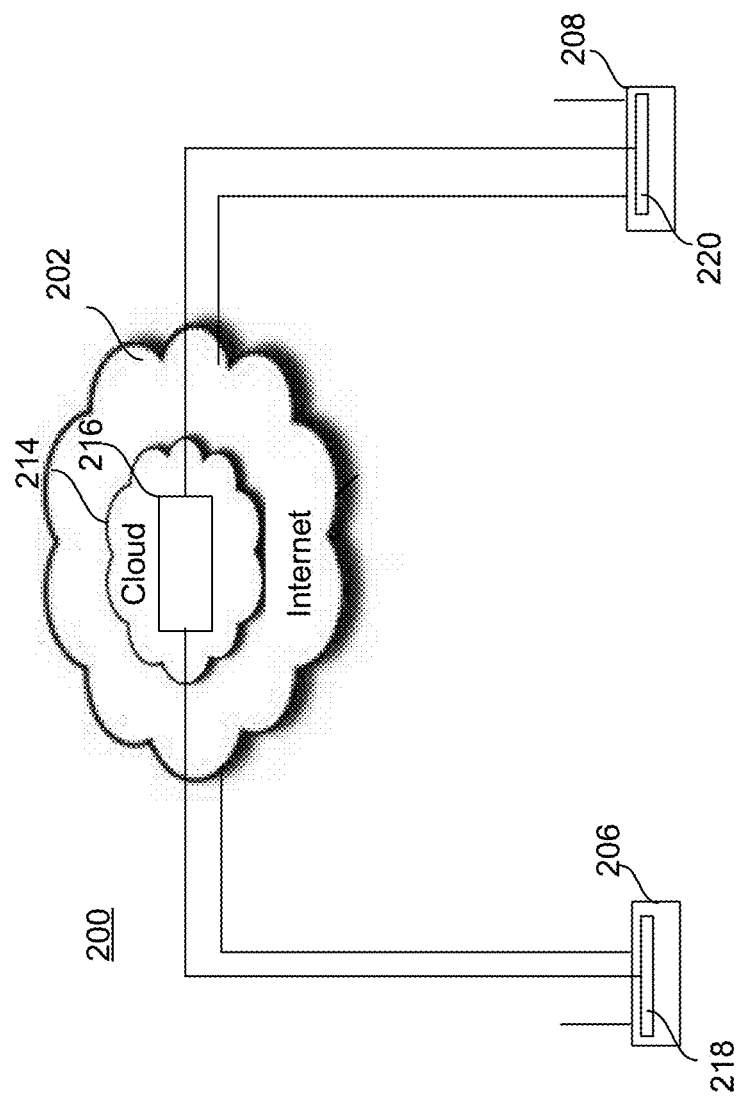
FIG. 2 illustrates an embodiment of a social bandwidth sharing system 200 for sharing with other devices a network connection of an Internet-connected user device that belongs to a particular user.

FIG. 2 illustrates an embodiment of a social bandwidth sharing system 200 for sharing with other devices a network connection of an Internet-connected user device that belongs to a particular user. Social bandwidth sharing system 200 includes a cloud-based social bandwidth manager 216 that is deployed in a cloud 214 in the backbone Internet 202. System 200 further includes a plurality of cloud-based social bandwidth applications (218 and 220) that communicate with cloud-based social bandwidth manager 216. Cloud-based social bandwidth application 218 is installed on an Internet-connected user device 206, and cloud-based social bandwidth application 220 is installed on a wireless-enabled device 208 that can be configured to share the network connection of Internet-connected user device 206. Wireless-enabled device 208 may include other devices owned by the Internet-connected device user (e.g., those devices that do not have any cellular subscriptions). Wireless-enabled device 208 may also include any authorized devices that do not belong to the Internet-connected device user, such as the devices of his/her friends, family members, and any authorized persons.

Social bandwidth sharing system 200 may further include a user interface to a cloud-based social bandwidth application. The user interface allows a user to receive or enter information into social bandwidth sharing system 200. For example, as will be described in greater detail below, a user of Internet-connected user device 206 may use the user interface to configure the device's wireless network (e.g., the network's SSID and passphrase). The user may also use the user interface to authorize or un-authorize friends. The user may also use the user interface to grant different levels of privileges to different friends and family members.

Figure 3:
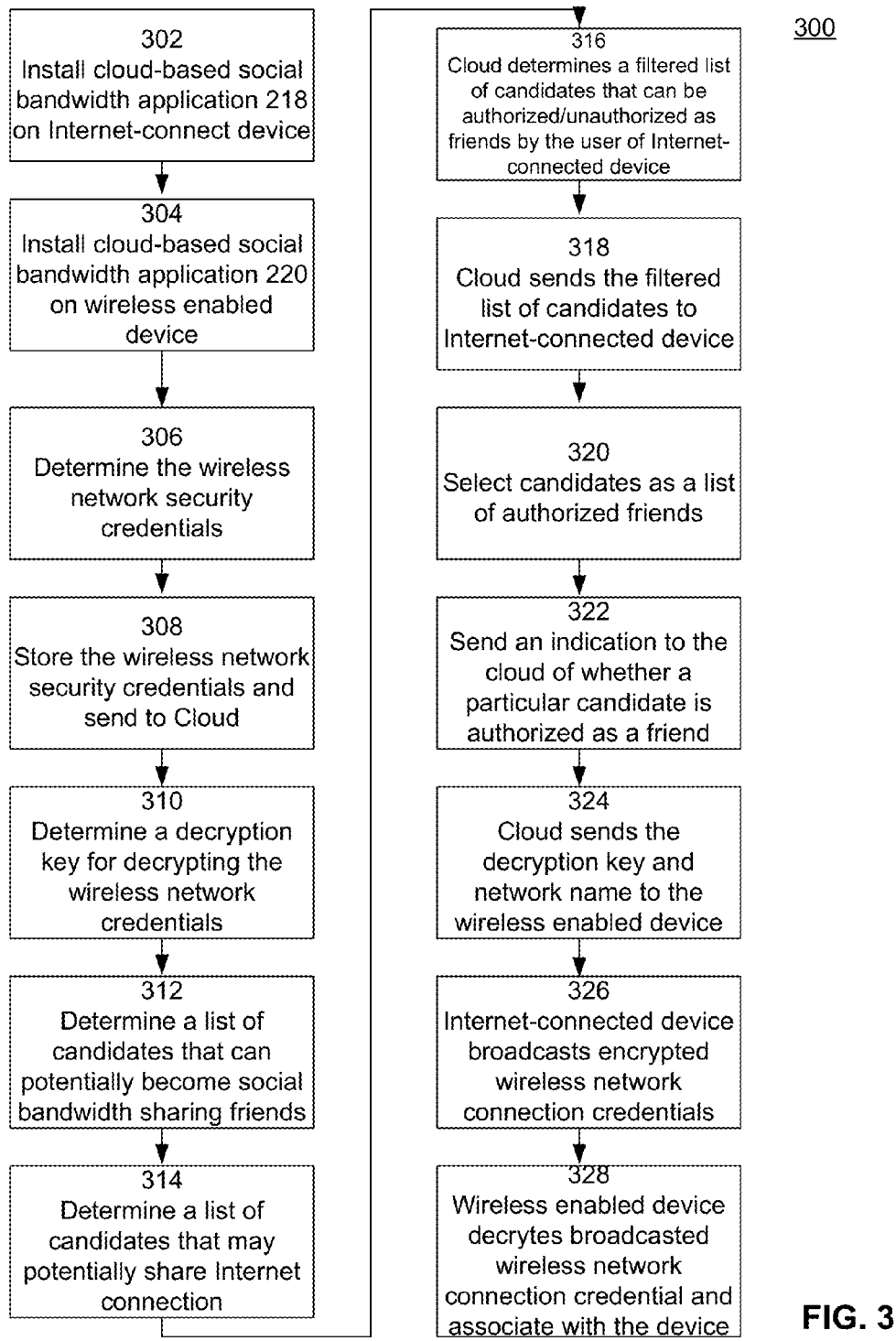
FIG. 3 illustrates an embodiment of a flow chart 300 for sharing with other devices an Internet connection of an Internet-connected user device.

FIG. 3 illustrates an embodiment of a flow chart 300 for sharing with other devices an Internet connection of an Internet-connected user device. Flow chart 300 includes steps that are performed by one of the following: cloud-based social bandwidth manager 216, cloud-based social bandwidth application 218, and cloud-based social bandwidth application 220. It should be recognized that some of the steps of flow chart 300 may be optional, performed simultaneously, or performed in a different order from that is shown in FIG. 3.

At 302, cloud-based social bandwidth application 218 is installed on Internet-connected device 206. Cloud-based social bandwidth application 218 may be installed by the user. For example, the user may download the application from a website and install the application onto Internet-connected device 206 himself. The cloud-based social bandwidth application may also be pre-compiled into the firmware by the device vendor.

At 304, cloud-based social bandwidth application 220 is installed on wireless-enabled device 208. Wireless enabled device 208 is a device that can be further configured to request the sharing and usage of the Internet connection of Internet-connected device 206. Cloud-based social bandwidth application 220 may be installed by the user. For example, the user may download the application from a website and install the application onto wireless enabled device 208 himself. The cloud-based social bandwidth application may also be pre-compiled into the firmware by the device vendor.

At 306, cloud-based social bandwidth application 218 determines the wireless network security credentials of the wireless network that Internet-connected device 206 is acting as an access point (AP) for. The wireless network may be one of several different types of wireless networks, including Wi-Fi (a wireless local area network), Bluetooth, MiFi (a mobile Wi-Fi hotspot), and the like. For example, for a Wi-Fi network, the wireless network security credentials determined by cloud-based social bandwidth application 218 include the network name (i.e., the SSID) and the passphrase. In some embodiments, the user of Internet-connected device 206 is prompted by the user interface of cloud-based social bandwidth application 218 to enter the wireless network security credentials via the user interface.

At 308, cloud-based social bandwidth application 218 stores the wireless network security credentials of the wireless network. The application may store the credentials locally for later retrieval. In addition, the application may configure the wireless network using the wireless network security credentials. The application also sends the wireless network security credentials to cloud-based social bandwidth manager 216 for storage.

At 310, cloud-based social bandwidth application 218 determines a decryption key that can be later used by any social bandwidth friend devices to decrypt the wireless network security credentials of the wireless network. In particular, at a later time, the wireless network security credentials will be broadcasted using a short-range wireless protocol (e.g., Bluetooth technology) by Internet-connected device 206 and heard by a social bandwidth friend device (e.g., wireless enabled device 208 if it has obtained friend authorization at the time) when the social bandwidth friend device is within the Internet-connected device's short-range wireless signal range. Cloud-based social bandwidth application 218 stores the decryption key locally and sends the decryption key to cloud-based social bandwidth manager 216 for storage as well.

At 312, cloud-based social bandwidth application 218 determines a list of candidates that can potentially become social bandwidth sharing friends of Internet-connected device 206, and sends the list of candidates to cloud-based social bandwidth manager 216. Each of the candidates is identified by a unique user identifier. In a preferred embodiment, the list of candidates may be collected from the device's phone book, and each of the candidates is identified by a unique user identifier—his phone number. In other embodiments, the list of candidates may be collected from other sources, including the contact lists on social network accounts, including Facebook, Google+, Twitter, LinkedIn, and the like. In some other embodiments, the user of Internet-connected device 206 may be prompted by the user interface of cloud-based social bandwidth application 218 to enter his friends' unique user identifiers to form the candidate list. Cloud-based social bandwidth application 218 may also send the unique user identifier associated with Internet-connected device 206 (e.g., its phone number) to cloud-based social bandwidth manager 216.

At 314, cloud-based social bandwidth application 220 determines a list of candidates that can potentially share their network connections with wireless enabled device 208, and sends the list of candidates to cloud-based social bandwidth manager 216. Each of the candidates is identified by a unique user identifier. In a preferred embodiment, the list of candidates may be collected from wireless enabled device's (208) phone book, and each of the candidates is identified by a unique user identifier—his phone number. In other embodiments, the list of candidates may be collected from other sources, including the contact lists on social media accounts, including Facebook, Google+, Twitter, LinkedIn, and the like. In some other embodiments, the user of wireless enabled device 208 may be prompted by the user interface of cloud-based social bandwidth application 220 to enter his friends' unique user identifiers to form the candidate list. Step 314 is performed on wireless enabled device 208 when the device has Internet access and therefore can establish a communication with cloud-based social bandwidth manager 216. For example, step 314 may be performed by cloud-based social bandwidth application 220 when the user of wireless enabled device 208 is at home and the device is connected to the user's home network. Cloud-based social bandwidth application 220 may also send the unique user identifier associated with wireless enabled device 208 (e.g., its phone number) to cloud-based social bandwidth manager 216.

At 316, cloud-based social bandwidth manager 216 determines a filtered list of candidates that can be further verified and authorized by the user of Internet-connected device 206 as social bandwidth sharing friends. Cloud-based social bandwidth manager 216 may use different policies to determine the filtered list of candidates. In some embodiments, the policies may be configurable by the user of Internet-connected device 206 or the user of wireless enabled device 208, or both.

In some embodiments, the policy is that a candidate on the filtered list of candidates must be on the list determined at step 312 and the list determined at step 314 as well. The rationale is that if the phone number of wireless enabled device 208 appears in the phone book of Internet-connected device 206 and the phone number of Internet-connected device 206 also appears in the phone book of wireless enabled device 208, then the users of the two devices know each other and therefore may be willing to share an Internet connection together.

In some embodiments, the policy is that a candidate on the filtered list of candidates must be on the list determined at step 312, but not necessarily on the list determined at step 314; however, the candidate should at least be a registered user of social bandwidth sharing system 200. The rationale of the policy is that if the phone number of wireless enabled device 208 appears in the phone book of Internet-connected device 206, then the user of Internet-connected device 206 knows the user of wireless enabled device 208 and therefore may be interested in sharing his network connection with the user of wireless enabled device 208.

At 318, cloud-based social bandwidth manager 216 sends the filtered list of candidates obtained at 316 to cloud-based social bandwidth application 218.

At 320, cloud-based social bandwidth application 218 may use different policies to authorize or un-authorize each candidate on the filtered list of candidates. The candidates that are authorized form a list of social bandwidth sharing friends of Internet-connected device 206, and a notification of whether a particular candidate is authorized or not as a social bandwidth sharing friend is sent to cloud-based social bandwidth manager 216 at 322. In some embodiments, the policies used to authorize or un-authorize candidates may be configurable by the user of Internet-connected device 206. In some other embodiments, the user of Internet-connected device 206 may be prompted by the user interface of cloud-based social bandwidth application 218 to individually authorize or un-authorize a particular candidate on the filtered list of candidates via the user interface. The user may also use the user interface to grant different levels of privileges to different friends and family members. For example, different levels of social bandwidth sharing friends (e.g., levels 1, 2, and 3) are allocated different data bytes per month. After the list of social bandwidth sharing friends is determined by cloud-based social bandwidth application 218, the list may be stored locally by cloud-based social bandwidth application 218.

At 324, cloud-based social bandwidth manager 216 notifies cloud-based social bandwidth application 220 that wireless enabled device 208 has been authorized by Internet-connected device 206 as a social bandwidth sharing friend and sends to cloud-based social bandwidth application 220 the decryption key determined at 310 and the wireless network name (e.g., SSID) obtained at 306.

After step 324, Internet-connected device 206 and wireless enabled device 208 are ready to share a network connection together when wireless enabled device 208 is next within Internet-connected device 206's wireless coverage area, as will be described in steps 326 and 328 below.

At 326, cloud-based social bandwidth application 218 periodically broadcasts a beacon. The beacon includes the wireless network security credentials of the wireless network that Internet-connected device 206 is acting as an AP for. The wireless network security credentials are broadcasted using a short-range wireless protocol (e.g., Bluetooth technology) by cloud-based social bandwidth application 218 and can be heard by a social bandwidth friend device when the friend device is within the Internet-connected device's short-range wireless signal range (e.g., three to thirty-three feet for Bluetooth technologies).

At 328, wireless enabled device 208 comes within Internet-connected device's short-range wireless signal range and hears the periodic beacon sent by Internet-connected device 206. The beacon includes the wireless network connection credentials (i.e., the network name and the passphrase) for the wireless network, but the passphrase is encrypted. Cloud-based social bandwidth application 220 uses the decryption key associated with the wireless network name to decrypt the passphrase in the beacon, and the passphrase may be used by cloud-based social bandwidth application 220 to associate with the wireless network and share the Internet connection of Internet-connected device 208 next.

Social bandwidth sharing system 200 in FIG. 2 has a number of advantages. Configuring a tethering session between a smartphone and another device using system 200 is simple and efficient. There is no need for a user to memorize or keep track of a very long passphrase and enter the long passphrase manually and correctly. Social bandwidth sharing system 200 allows a user to share his network connection among all his personal devices or other devices he authorized as social bandwidth sharing friends. When an authorized social bandwidth sharing friend is in close proximity to the user's device, the friend device can automatically discover the user's device, obtain the wireless network security credentials from the user's device, and then proceed to share the network connection of the user's device seamlessly. This way, the passphrase of the wireless network does not need to be pushed to the friend device until it is needed. As a result, even if the wireless network security credentials have changed over time, the passphrase obtained by the friend device remains the most updated version.

In some embodiments, social bandwidth sharing system 200 may be deployed by an enterprise (e.g., a company) to provide wireless network security credentials to its customers. For example, a user may establish a friend relationship with a company using a cloud-based social bandwidth application. Once accepted as a friend, network security credentials for the networks at the company's locations may be pushed to the user's device. For example, a coffee shop may use system 200 to provide to a customer the network security credentials for a particular location when the customer visits the location.

In some embodiments, social bandwidth sharing system 200 may be used to optimize roaming cellular data usage. For example, a first user may subscribe to a cellular data plan in a first country (e.g., the United States), and a second user may subscribe to a data plan in a second country (e.g., Slovenia). While the first user is visiting his friend, the second user, the first user's device may automatically connect to a mobile hotspot and/or other cellular data connection associated with the second user's device. The first user may avoid roaming and/or other charges associated with connecting to the Slovenia cellular network.

Although the foregoing embodiments have been described in some detail for purposes of clarity of understanding, the invention is not limited to the details provided. There are many alternative ways of implementing the invention. The disclosed embodiments are illustrative and not restrictive.

What is claimed is:

1. A method of sharing a network connection by a cloud-based social bandwidth manager, comprising:
   receiving from an Internet-connected device, acting as a wireless access point (AP) for a wireless network, a decryption key and a network name corresponding to the wireless network, wherein a beacon broadcasted by the Internet-connected device includes the network name and an encrypted passphrase, and wherein the encrypted passphrase can be decrypted using the decryption key;
   receiving from the Internet-connected device an indication that a wireless enabled device is an authorized device to associate with the wireless network and share an Internet connection of the Internet-connected device;
   transmitting to the authorized wireless enabled device the network name and the decryption key, wherein the authorized wireless enabled device is configurable to detect the beacon broadcasted by the Internet-connected device and decrypt the encrypted passphrase included in the beacon using the decryption key and associate with the wireless network using the decrypted passphrase to share the Internet connection of the Internet-connected device;
   receiving from the Internet-connected device via a cloud-based social bandwidth application installed on the Internet-connected device a first list of candidates that can potentially become authorized wireless enabled devices to associate with the wireless network and share the Internet connection of the Internet-connected device;
   receiving from the wireless enabled device via a cloud-based social bandwidth application installed on the wireless enabled device a second list of candidates that can potentially share their network connections with the wireless enabled device;
   determining a filtered list of candidates based on the first list of candidates and the second list of candidates; and
   sending the filtered list of candidates to the Internet-connected device such that each candidate on the filtered list of candidates can be authorized or un-authorized to associate with the wireless network and share the Internet connection of the Internet-connected device.

2. The method of claim 1, wherein the cloud-based social bandwidth manager communicates with the Internet-connected device via a cloud-based social bandwidth application installed on the Internet-connected device, and wherein the cloud-based social bandwidth application includes a user interface to configure the wireless network, including the wireless network's security credentials.

3. The method of claim 1, wherein the cloud-based social bandwidth manager communicates with the Internet-connected device via a cloud-based social bandwidth application installed on the Internet-connected device, and wherein the cloud-based social bandwidth application determines the decryption key.

4. The method of claim 1, further comprising:
   receiving from the Internet-connected device via a cloud-based social bandwidth application installed on the Internet-connected device a list of candidates that can potentially become authorized wireless enabled devices to associate with the wireless network and share the Internet connection of the Internet-connected device.

5. The method of claim 4, wherein the list of candidates that can potentially become authorized wireless enabled devices to associate with the wireless network and share the Internet connection of the Internet-connected device are collected by the cloud-based social bandwidth application from a phone book on the Internet-connected device, and wherein each of the candidates is identified by a unique user identifier.

6. The method of claim 1, further comprising:
   receiving from the wireless enabled device via a cloud-based social bandwidth application installed on the wireless enabled device a list of candidates that can potentially share their network connections with the wireless enabled device.

7. The method of claim 6, wherein the list of candidates that can potentially share their network connections with the wireless enabled device are collected by the cloud-based social bandwidth application from a phone book on the wireless enabled device, and wherein each of the candidates is identified by a unique user identifier.

8. The method of claim 1, wherein the cloud-based social bandwidth manager communicates with the Internet-connected device via a cloud-based social bandwidth application installed on the Internet-connected device, and wherein the cloud-based social bandwidth application periodically broadcasts the beacon using Bluetooth technology.

9. The method of claim 1, wherein the cloud-based social bandwidth manager communicates with the wireless enabled device via a cloud-based social bandwidth application installed on the wireless enabled device, and wherein the cloud-based social bandwidth application detects the beacon broadcasted by the Internet-connected device and decrypts the encrypted passphrase included in the beacon using the decryption key and associates with the wireless network using the decrypted passphrase to share the Internet connection of the Internet-connected device.

10. The method of claim 1, wherein the wireless network is selected from the group consisting of: wireless local area network (Wi-Fi), Bluetooth, and MiFi.

11. A cloud-based social bandwidth manager for sharing a network connection, comprising:
   a processor configured to:
      receive from an Internet-connected device, acting as a wireless access point (AP) for a wireless network, a decryption key and a network name corresponding to the wireless network, wherein a beacon broadcasted by the Internet-connected device includes the network name and an encrypted passphrase, and wherein the encrypted passphrase can be decrypted using the decryption key;

receive from the Internet-connected device an indication that a wireless enabled device is an authorized device to associate with the wireless network and share an Internet connection of the Internet-connected device;

transmit to the authorized wireless enabled device the network name and the decryption key, wherein the authorized wireless enabled device is configurable to detect the beacon broadcasted by the Internet-connected device and decrypt the encrypted passphrase included in the beacon using the decryption key and associate with the wireless network using the decrypted passphrase to share the Internet connection of the Internet-connected device;

receive from the Internet-connected device via a cloud-based social bandwidth application installed on the Internet-connected device a first list of candidates that can potentially become authorized wireless enabled devices to associate with the wireless network and share the Internet connection of the Internet-connected device;

receive from the wireless enabled device via a cloud-based social bandwidth application installed on the wireless enabled device a second list of candidates that can potentially share their network connections with the wireless enabled device;

determine a filtered list of candidates based on the first list of candidates and the second list of candidates; and send the filtered list of candidates to the Internet-connected device such that each candidate on the filtered list of candidates can be authorized or un-authorized to associate with the wireless network and share the Internet connection of the Internet-connected device; and a memory coupled to the processor and configured to provide the processor with instructions.

12. The system of claim 11, wherein the cloud-based social bandwidth manager communicates with the Internet-connected device via a cloud-based social bandwidth application installed on the Internet-connected device, and wherein the cloud-based social bandwidth application includes a user interface to configure the wireless network, including the wireless network's security credentials.

13. The system of claim 11, wherein the cloud-based social bandwidth manager communicates with the Internet-connected device via a cloud-based social bandwidth application installed on the Internet-connected device, and wherein the cloud-based social bandwidth application determines the decryption key.

14. The system of claim 11, wherein the processor is further configured to:

receive from the Internet-connected device via a cloud-based social bandwidth application installed on the Internet-connected device a list of candidates that can potentially become authorized wireless enabled devices to associate with the wireless network and share the Internet connection of the Internet-connected device.

15. The system of claim 14, wherein the list of candidates that can potentially become authorized wireless enabled devices to associate with the wireless network and share the Internet connection of the Internet-connected device are collected by the cloud-based social bandwidth application from a phone book on the Internet-connected device, and wherein each of the candidates is identified by a unique user identifier.

16. The system of claim 11, wherein the processor is further configured to:

receive from the wireless enabled device via a cloud-based social bandwidth application installed on the wireless enabled device a list of candidates that can potentially share their network connections with the wireless enabled device.

17. The system of claim 16, wherein the list of candidates that can potentially share their network connections with the wireless enabled device are collected by the cloud-based social bandwidth application from a phone book on the wireless enabled device, and wherein each of the candidates is identified by a unique user identifier.

18. The system of claim 11, wherein the cloud-based social bandwidth manager communicates with the Internet-connected device via a cloud-based social bandwidth application installed on the Internet-connected device, and wherein the cloud-based social bandwidth application periodically broadcasts the beacon using Bluetooth technology.

19. The system of claim 11, wherein the cloud-based social bandwidth manager communicates with the wireless enabled device via a cloud-based social bandwidth application installed on the wireless enabled device, and wherein the cloud-based social bandwidth application detects the beacon broadcasted by the Internet-connected device and decrypts the encrypted passphrase included in the beacon using the decryption key and associates with the wireless network using the decrypted passphrase to share the Internet connection of the Internet-connected device.

20. The system of claim 11, wherein the wireless network is selected from the group consisting of: wireless local area network (Wi-Fi), Bluetooth, and MiFi.

21. A computer program product for sharing a network connection by a cloud-based social bandwidth manager, the computer program product being embodied in a tangible non-transitory computer readable storage medium and comprising computer instructions for:

receiving from an Internet-connected device, acting as a wireless access point (AP) for a wireless network, a decryption key and a network name corresponding to the wireless network, wherein a beacon broadcasted by the Internet-connected device includes the network name and an encrypted passphrase, and wherein the encrypted passphrase can be decrypted using the decryption key;

receiving from the Internet-connected device an indication that a wireless enabled device is an authorized device to associate with the wireless network and share an Internet connection of the Internet-connected device;

transmitting to the authorized wireless enabled device the network name and the decryption key, wherein the authorized wireless enabled device is configurable to detect the beacon broadcasted by the Internet-connected device and decrypt the encrypted passphrase included in the beacon using the decryption key and associate with the wireless network using the decrypted passphrase to share the Internet connection of the Internet-connected device;

receiving from the Internet-connected device via a cloud-based social bandwidth application installed on the Internet-connected device a first list of candidates that can potentially become authorized wireless enabled devices to associate with the wireless network and share the Internet connection of the Internet-connected device;

receiving from the wireless enabled device via a cloud-based social bandwidth application installed on the wireless enabled device a second list of candidates that can potentially share their network connections with the wireless enabled device;

determining a filtered list of candidates based on the first list of candidates and the second list of candidates; and sending the filtered list of candidates to the Internet-connected device such that each candidate on the filtered list of candidates can be authorized or un-authorized to associate with the wireless network and share the Internet connection of the Internet-connected device.

\* \* \* \* \*